(12) United States Patent
Voigt et al.

(10) Patent No.: US 7,605,977 B2
(45) Date of Patent: Oct. 20, 2009

(54) OPTICAL TELESCOPE

(76) Inventors: Che Ram Souza Voigt, 907 Wright St., Santa Rosa, CA (US) 95404; Allan Alfred Voigt, 400 Breezewood Dr., Geyserville, CA (US) 95441; John Mark Speicher, 133 Rossi, Geyserville, CA (US) 95441; Chet Alister Johnston, 536 Spencer Ave., Santa Rosa, CA (US) 95404; Eric Herlen Ford, 4210 Hampstead, La Canada, CA (US) 91011

( * ) Notice: Subject to any disclaimer, the term of this patent is extended or adjusted under 35 U.S.C. 154(b) by 0 days.

(21) Appl. No.: 10/948,432

(22) Filed: Sep. 22, 2004

(65) Prior Publication Data

US 2006/0061856 A1 Mar. 23, 2006
US 2009/0225406 A9 Sep. 10, 2009

Related U.S. Application Data

(63) Continuation-in-part of application No. 10/763,297, filed on Jan. 21, 2004, now Pat. No. 7,023,615.

(51) Int. Cl.
*G02B 23/00* (2006.01)
*G02B 23/12* (2006.01)

(52) U.S. Cl. ..................... 359/399; 359/353

(58) Field of Classification Search ............... 359/399, 359/421, 422, 423, 353, 351, 354
See application file for complete search history.

(56) References Cited

U.S. PATENT DOCUMENTS 6,222,187 B1 * 4/2001 Shivanandan ............... 250/330
7,023,615 B1 * 4/2006 Voigt et al. .................. 359/399

* cited by examiner

*Primary Examiner*—Alessandro Amari
(74) *Attorney, Agent, or Firm*—Risto A. Rinne, Jr.

(57) ABSTRACT

An apparatus for enhanced viewing of objects in two separate simultaneous frequency bands of light that is constructed in accordance with the principles of the present invention includes a primary mirror and a moveable secondary mirror that is disposed above the primary mirror to provide a long focal length. A beam splitter splits the optical path into two paths, one for infrared and another path for visible. Various optical elements and devices are described along each path. The secondary mirror is displaced away from its concentric position over the primary mirror to provide shorter focal lengths in IR and visible. Focal Plane Arrays (FPA's) are disposed where desired along both optical paths for real-time viewing and data acquisition. The preferred FPA in visible is a CCD. The preferred FPA in IR is disposed in a Dewar.

60 Claims, 5 Drawing Sheets

OPTICAL TELESCOPE

This application is a continuation-in-part of prior U.S. patent application Ser. No. 10/763,297, entitled "Structure for Supporting an Optical Telescope", that was filed on Jan. 21, 2004 and which issued as U.S. Pat. No. 7,023,615 on Apr. 4, 2006 and this application fully includes the content, specification, and drawings of the above application by reference herein and this application claims benefit of the date of priority thereof.

BACKGROUND OF THE INVENTION

1. Field of the Invention

The present invention, in general, relates to telescopes and, more particularly, to a variable field of view telescope that is adapted for simultaneous use with visible and infrared wavelengths.

Cassegrain types of telescopes are well known reflector-types of telescopes that are used in both the recreational arts for astronomy and ground observation and also for commercial purposes as well as for certain military applications. In general, they offer a longer focal length in a more compact package. It is desirable with all optical systems to obtain as much light energy as possible (i.e., to provide a large aperture) in as compact and rigid a structure as is possible.

Variable field of view telescopes that include a plurality of field of view optical groups for insertion into the optical path are also known. The known prior art devices utilize a "C" structure that extends in an arc from the base of a primary mirror to a position over the primary mirror. A turret attached to the upper end of the C structure is used to suspend the plurality of optical groups a predetermined distance over the primary mirror.

The plurality of optical groups that are disposed on the turret are arranged for sequential insertion of one group into the field of view following the simultaneous withdrawal of a preceding group from the field of view. Accordingly, one optical group is always disposed in the field of view.

While providing the benefit of being able to withdraw and then insert one of several optical groups into the field of view (to affect the field of view), there are several disadvantages inherent with this type of design. An important disadvantage is that the C structure incurs considerable flexing that is an inherent characteristic due to the length of the arm and the fact that it is supported only at the base of the structure.

This can cause misalignment of the optical groups and resultant distortion in the optical path. Also, because of the long length of the C structure, thermal expansion and contraction effects can further contribute to misalignment and error along the optical path or limit the temperature range in which the equipment can properly function.

Also, the C structure obstructs a significant quantity of light energy that would otherwise impede upon the primary mirror. The C structure provides only one point of mechanical support. Therefore, it must be mechanically large and strong enough so as to sufficiently limit flexing and vibration. Because the structure is supported on the outside of the primary mirror, a long moment arm is also created from the base of the C structure to the turret. It is the long moment arm that is subject to flexing and the turret that is subject to vibration.

Vibration can be in response to any mechanical energy that the C structure experiences. For example, vibration of the engine(s) that propel the vehicle or aircraft may be transmitted to the C structure. While there is always the possibility for vibration of the moment arm, there is also the possibility that the length of the arm can resonate in a harmonic frequency thereby increasing the amplitude of vibration.

To minimize flexing and vibration of the C structure design, it is built as large and as strong as it needs to be in order to function in any given environment. However, this is not desirable because it is preferable that the C structure be as small as possible so as to minimize the amount of light energy that it obstructs. Accordingly, a tradeoff is made in the prior art design that sacrifices light gathering ability for necessary rigidity.

Also, the larger the C structure is, the heavier it also becomes. This is another limitation that is an especially important consideration in various circumstances, for example, when the telescope is used in an aircraft or spacecraft. While it is desirable that a telescope be lightweight, this is crucial in certain applications.

The prior art design also relies upon the use of moveable hard stops to repeat the position that the plurality of optical groups are maintained in. This limits the speed by which optical groups can be changed without causing damage.

Furthermore, when any of the plurality of optical groups are moved into and out of the optical path, it is desirable that precise repeatability of their position occur, else the optical path is adversely affected. The prior art designs that require variability in the stops are unable to provide optimum repeatability in the positioning of the optical groups.

An especially significant limitation with the prior art designs is that the field of view changes in steps according to the number and optical characteristics of the various optical groups. It is desirable to be able to step in IR and also to provide a progressive zoom capability in visible as well, which the prior art fails to provide.

The prior art designs are also limited in their ability to provide both IR (infrared) and visible light gathering ability. Separate optical paths are typically required. If the telescope is used in a gimbal ball, for example, this would result in having two apertures in the gimbal ball, one for visible and one for IR. This is undesirable for many reasons.

There are many light frequencies that may be of interest. It is desirable to be able to view two or more channels simultaneously and also to change the field of view (FOV) from between wide angle FOV (lower magnification) and narrow FOV (higher magnification) capabilities. Prior art designs have been unable to effectively switch back and forth between infrared and visible light while also providing a zoom capability in visible.

For many applications it is desirable to be able to zoom in the visible spectrum. For example, if after detecting an object of interest using a wide field of view (in either the visible spectrum or IR spectrum), it is desirable to then be able to narrow the field of view and zoom in to complete a closer examination of the object. If the object of interest was first discovered as a presence in the infrared spectrum, it may be desirable to switch to the visible spectrum and zoom in accordingly.

It is also desirable to be able to gather data in both spectrums simultaneously, for example in a narrow FOV in IR and in visible. Ideally, the data in both wavelengths could be recorded for future comparison and subsequent analysis. It is desirable then that a recording camera or some other type of transducer (i.e., a focal plane array; FPA) be placed in the field of view, as desired.

Prior art designs have provided limited zoom capability in the visible spectrum. This is because a rigid and relatively long physical path is required to house the optical elements that typically accompany an optical zoom system.

Furthermore, space is often a commodity in short supply, especially if the telescope is to be housed in a gimbal ball.

Accordingly, it is desirable to be able to provide a space to accommodate the optical elements of a visible zoom optical system and do so in such manner as to provide an optimally long linear path that is especially rigid. It would also be a significant and unexpected benefit if the structures used for the visible optical zoom system were able to provide increased rigidity to the overall structure for supporting an optical telescope.

As mentioned briefly hereinabove, there are many possible frequencies of light (electromagnetic) energy that may of interest depending upon the application. It is desirable to provide versatility in such an instrument to change the transducers and analyze the relevant spectrums that may be of interest.

The structural limitations that have, heretobefore, prevented the design of such an optical system have been satisfied by the disclosure of the related patent application, herein incorporated by reference. Even so, an optical system that provides such versatility has been previously unavailable and it is the subject of the instant disclosure to describe such capability.

Accordingly, there exists today a need for an optical telescope that helps ameliorate the above-mentioned problems and limitations.

Clearly, such an apparatus would be an especially useful and desirable device.

2. Description of Prior Art

Telescopes and zoom lenses are, in general, known. For example, the following patent describes various types of these devices:

U.S. Pat. No. 5,907,433 to Voigt et al, May 25, 1999; and
U.S. Pat. No. 5,940,222 to Sinclair et al, Aug. 17, 1999.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an optical telescope that is especially compact.

It is also an important object of the invention to provide an optical telescope that provides simultaneous viewing in infrared and visible wavelengths.

It is yet an important object of the invention to provide an optical telescope that includes a simultaneous dual optical path.

It continues as an important object of the invention to provide an optical telescope that includes a simultaneous dual optical path wherein each path includes a different wavelength of light.

Another object of the invention is to provide an optical telescope that includes a focal plane array (FPA) to capture an image.

Still another object of the invention is to provide an optical telescope that provides a step field of view change in infrared.

Still yet another object of the invention is to provide an optical telescope that provides zoom capability in visible.

Yet another important object of the invention is to provide an optical telescope that provides approximately a five to one change in field of view per step change in the field of view in infrared.

Still yet another important object of the invention is to provide an optical telescope that provides approximately a twenty-five to one change in focal length in infrared.

A first continuing object of the invention is to provide an optical telescope that includes a CCD as the FPA in a visible wavelength beam path.

A second continuing object of the invention is to provide an optical telescope that includes an FPA in a Dewar in an infrared beam path.

A third continuing object of the invention to provide an optical telescope that includes a wide and mid FOV in infrared without the use of either a primary or a secondary mirror.

A fourth continuing object of the invention to provide an optical telescope that includes a narrow FOV in infrared with the use of a primary and secondary mirror.

A fifth continuing object of the invention to provide an optical telescope that includes a large aperture for narrow FOV focal lengths in either IR or visible.

A sixth continuing object of the invention to provide an optical telescope that includes an IR turret carousel that is adapted to rotate between a plurality of positions, the carousel being disposed along an infrared path.

A seventh continuing object of the invention to provide an optical telescope that includes an independent zoom lens group in visible.

An eighth continuing object of the invention to provide an optical telescope that includes a zoom lens group in visible that has a front zoom group of lenses and a back zoom group of lenses that move toward each other or away from each other to increase or decrease focal length.

A ninth continuing object of the invention to provide an optical telescope that includes an IR turret carousel that is adapted to rotate between three positions along an infrared path, and wherein the carousel includes two groups of lenses for use in mid and wide FOV and a clear optical path with no lenses for use in narrow FOV.

A tenth continuing object of the invention to provide an optical telescope that includes an FPA in the infrared optical path.

An eleventh continuing object of the invention to provide an optical telescope that includes an FPA in the visible optical path.

A twelfth continuing object of the invention to provide an optical telescope that includes an FPA in the infrared optical path and an FPA in the visible path for simultaneous acquisition of data on two different wavelengths.

A thirteenth continuing object of the invention to provide an optical telescope that includes an FPA in the infrared optical path and an FPA in the visible path for simultaneous acquisition of data on two different wavelengths and at two different focal lengths (i.e., FOV).

A fourteenth continuing object of the invention to provide an optical telescope that includes an optimized diffraction-limited focal length in both IR and visible.

Briefly, an optical telescope that is constructed in accordance with the principles of the present invention includes the support structures of the related patent, herein incorporated by reference. When a secondary mirror is in position, a dichroic beam splitter acts as a band pass filter to split a primary optical path into two paths, one for infrared and another path for visible. A narrow FOV is provided for infrared along one path and a narrow FOV is provided in visible along the other path when the secondary mirror is disposed over the primary mirror and both mirrors are included in the optical paths. When a secondary mirror is displaced away from its concentric position over the primary mirror, the primary mirror is not used and a shorter focal length (i.e., a wider FOV) is provided for both visible and infrared. An IR turret functions as a carousel to insert or remove groups of lenses from the IR path, thereby providing a step function to vary the IR focal length from wide to intermediate FOV. When the secondary and primary mirrors are used, the IR turret is moved to a position that does not insert any groups of lenses into the IR path. As desired, a zoom lens group is provided in visible that receives visible light that has been collimated after reflecting off the primary and secondary mirrors and the dichroic beam splitter. When the secondary mirror is pivoted into a second position (away from the primary), the dichroic splitter and certain of the visible lens groups look directly out into space and receives collimated ambient light (all frequencies). The IR and visible paths can then be used for calibration purposes or, if desired, for viewing at shorter focal lengths than when the primary and the secondary mirror are in use. Focal Plane Arrays (FPA's) are disposed where desired along both optical paths for simultaneous acquisition of real-time data. The output of the FPA's is saved on any preferred media, as desired, for later analysis. The preferred FPA in visible is a CCD. The preferred FPA in IR is disposed in a Dewar.

DETAILED DESCRIPTION OF THE INVENTION

Figure 1:
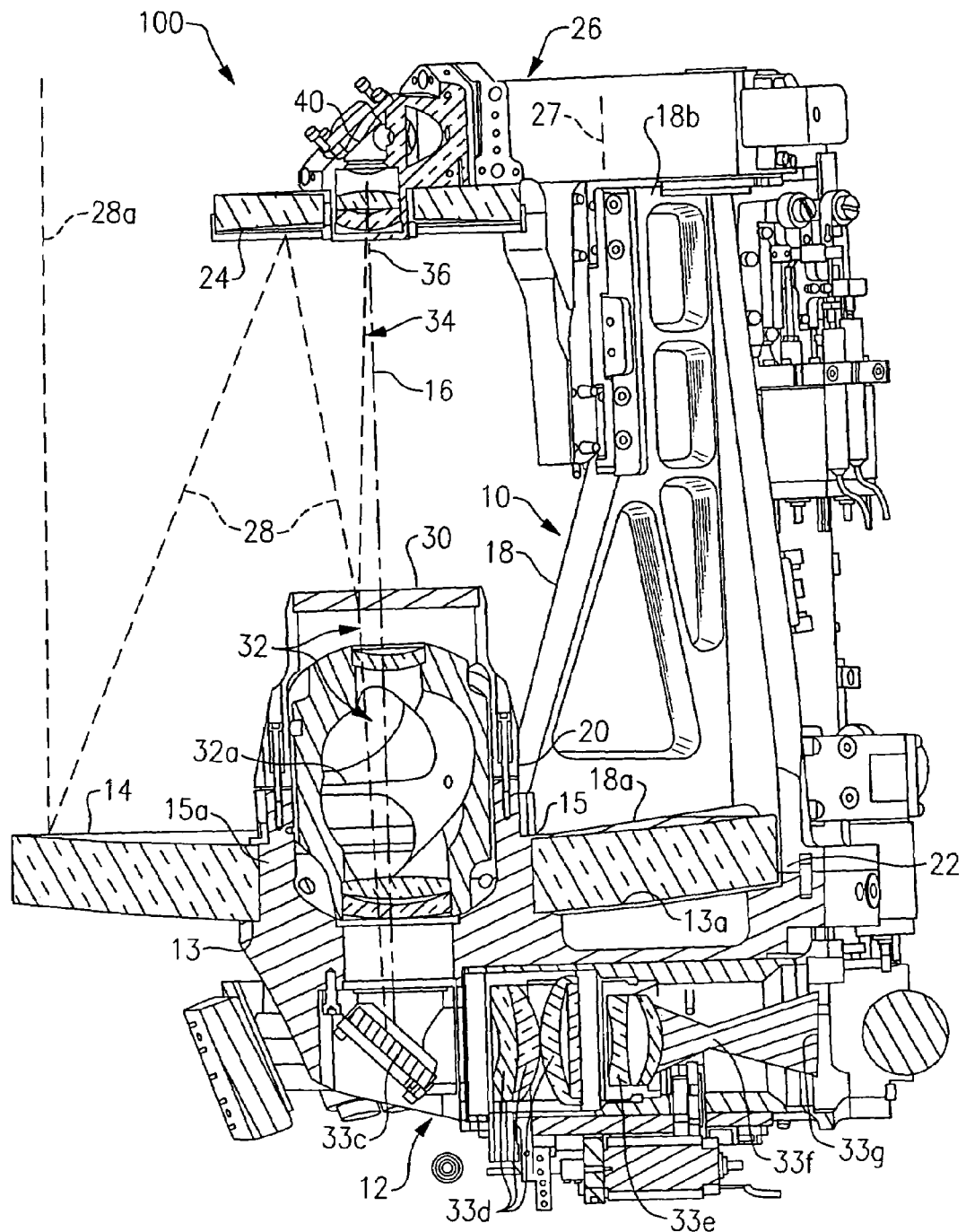
FIG. 1 is a cross sectional view of an optical telescope taken on the line B-B in FIG. 2.

Whenever possible, the reference numerals used in patent application Ser. No. 10/763,297, entitled "Structure for Supporting an Optical Telescope", that was filed on Jan. 21, 2004, and which is herein incorporated by reference, are used in this disclosure for the purpose of maintaining consistency. Certain portions of the specification of the prior patent application are essential to an understanding of the instant invention and these portions have been edited and included herein to improve clarity of the instant disclosure.

Referring on occasion to all of the drawing figures and now in particular to FIG. 1, is shown in cross-section, a structure for supporting an optical telescope, identified in general by the reference numeral 10.

The structure 10 is used to support a variety of optical components, as are described in greater detail herein to provide an optical telescope 100.

A base assembly, identified in general by the reference numeral 12, supports the essential component parts of the telescope 100.

A large primary mirror 14 gathers substantial incident radiation thereby providing a large aperture for the optical telescope 100 in a compact structure. The primary mirror 14 includes a center aperture 15 that includes a diameter sufficient to clear an upper portion 15a of the base 12. The primary mirror 14 rests directly on the base assembly 12 on a support ring 13 that provides a circle of support that is proximate the center aperture 15.

A gap 13a exists intermediate the base assembly 12 and the primary mirror 14. Therefore, the only support for the primary mirror is provided by the ring 13 that extends around the center aperture 15.

The primary mirror 14 is attached to the base assembly 12 by any method that is desired, typically by the use of an adhesive. Accordingly, the primary mirror 14 is adhered to the ring 13.

The center aperture 15 includes a center longitudinal axis 16 (shown in dashed line) that passes vertically through the center of the primary mirror's 14 aperture 15.

An upright member 18 includes a first end 18a and an opposite second end 18b. The first end 18a is attached to the base assembly 12 at a first location 20 and at a second location 22. The first location 20 is located inside the aperture 15. The second location 22 is located outside (i.e., beyond) the circumference of the primary mirror 14. Attachment of the upright member 18 to the base 12 at the first and second locations 20, 22 is by a plurality of threaded screws (not shown) or any other preferred method.

Accordingly, the upright member 18 is supported on two opposite sides (i.e., the first and second sides 20, 22) at the first end 18a. This provides maximum support and rigidity. The upright member 18, because it is supported both inside the aperture 15 and beyond the circumference of the primary mirror 14, is optimally thin (which blocks a minimum of incident radiation on the primary mirror 14) while also being maximally rigid. See FIG. 2.

Figure 5:
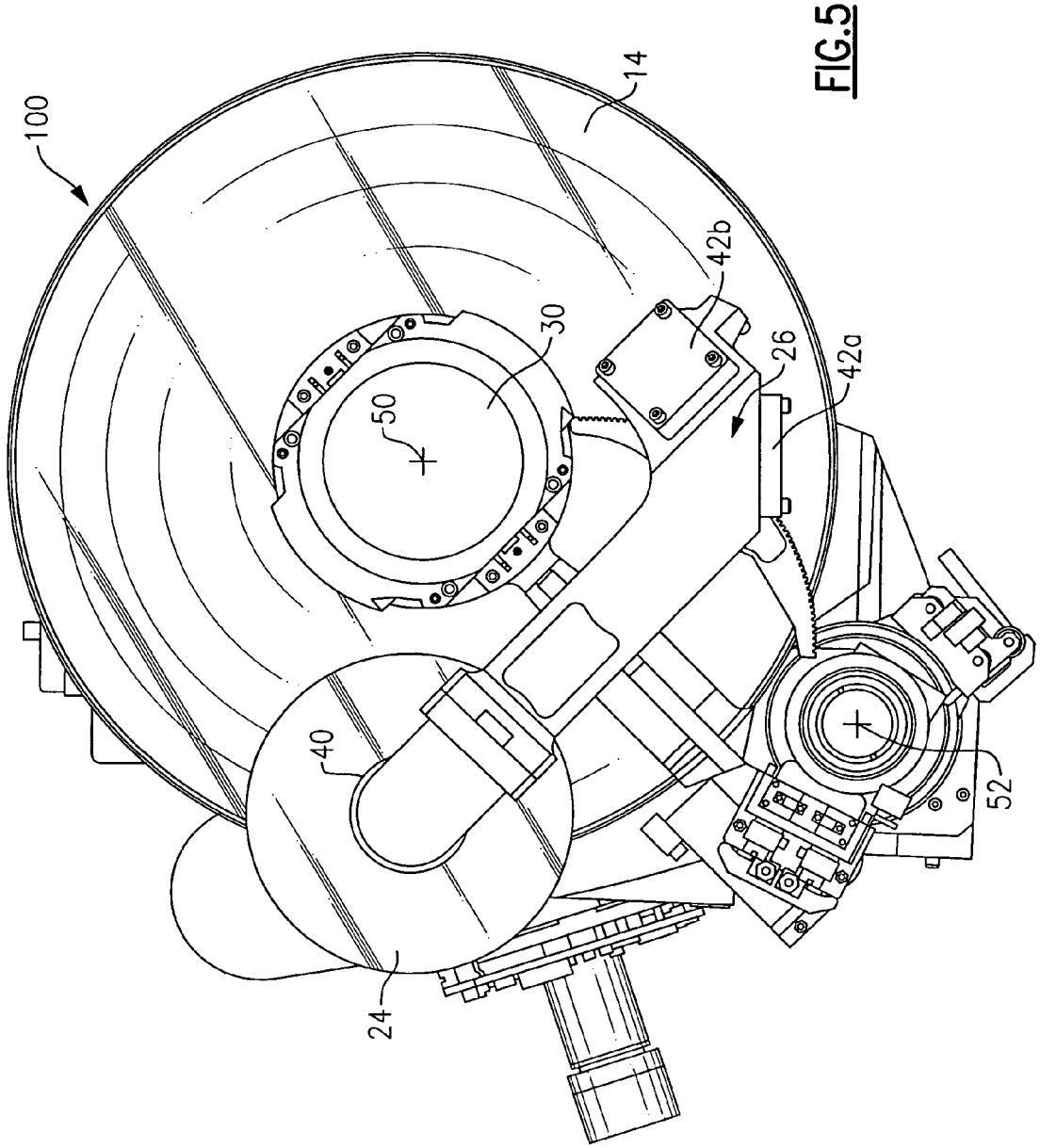
FIG. 5 is a top view of the telescope of FIG. 1 looking down along a center longitudinal axis of the primary mirror with a turret and the secondary mirror disposed in a second position, out of the optical path.

A secondary mirror 24 is attached to a turret assembly, identified in general by the reference numeral 26. The turret 26 is attached to the second end 18b of the upright member 18. The turret 26 is adapted to pivot about an axis 27 from a first position (as shown in FIG. 1) in which a center of the secondary mirror 24 aligns with the center longitudinal axis 16 into a second position (as shown in FIG. 5) in which the center of the secondary mirror 24 does not align with the center longitudinal axis 16.

In the first position, the turret 26 and the upright member 18 (disposed under the turret 26) obstruct a minimum of light energy. In the second position (as is described in greater detail hereinafter, the primary mirror 14 is not utilized and, accordingly, any obstruction of light energy by the turret 26 or secondary mirror 24 on the primary mirror 14 is, therefore, of no consequence.

As is further shown in FIG. 1, while in the first position, a first optical path (shown in general by arrow 28) is provided in which incident light 28a that strikes the primary mirror 14, is reflected to the secondary mirror 24 and down to a dichroic beam splitter 30 that is disposed on the upper portion 15a and elevated over the center aperture 15 of the primary mirror 14.

The dichroic beam splitter 30 divides (or splits) the first optical path 28 into a first secondary optical path (shown by arrow 32) that passes through the beam splitter 30 and through the center aperture 15 and into a second secondary optical path (shown by arrow 34) that is reflected up off of the beam splitter 30 and through a second center aperture 36 of the secondary mirror 24.

The dichroic beam splitter 30 is a band pass filter that allows longer wavelengths of light in the infrared spectrum to pass through the beam splitter 30 along the first secondary optical path 32. The beam splitter 30 appears, essentially, as a mirror to the shorter wavelengths of light. Therefore, the shorter wavelengths of light comprising the visible spectrum and beyond are reflected off of the beam splitter 30 along the second secondary optical path 34.

Additional optical groups and elements are disposed along the first secondary optical path 32, as shown. In particular, an IR turret 32a includes a plurality of movable optical groups that are described in greater detail hereinafter.

The IR turret 32a is urged to rotate by a drive shaft 32b (see FIG. 3) that passes through an opening provided in the upright member 18 proximate the first end 18a thereof. The drive shaft 32b is powered by an electrical motor that is disposed outside the primary mirror 14.

The IR turret 32a rotates about a turret axis 32c that passes through a center of the drive shaft 32b and is adapted to move at least one optical element 32d into a position that is below the surface of the primary mirror 14. Placement of the optical element 32d below the surface of the primary mirror 14 provides a converging optical bundle having a low f number below the primary mirror 14.

Accordingly, the structure for supporting an optical telescope 10 allows for the placement of the optical element 32d below the primary mirror 14 in the optical field resulting in exceptional optical performance in a compact overall structure 10. As the IR turret 32a is rotated, additional optical elements (that are included as a part of the IR turret 32a) are also adapted to be rotated and disposed in the optical field below the primary mirror 14.

The IR turret 32a is a type of a carousel that includes, preferably, three different optical configurations that can be rotated into position along the first secondary optical path 32.

Figure 3:
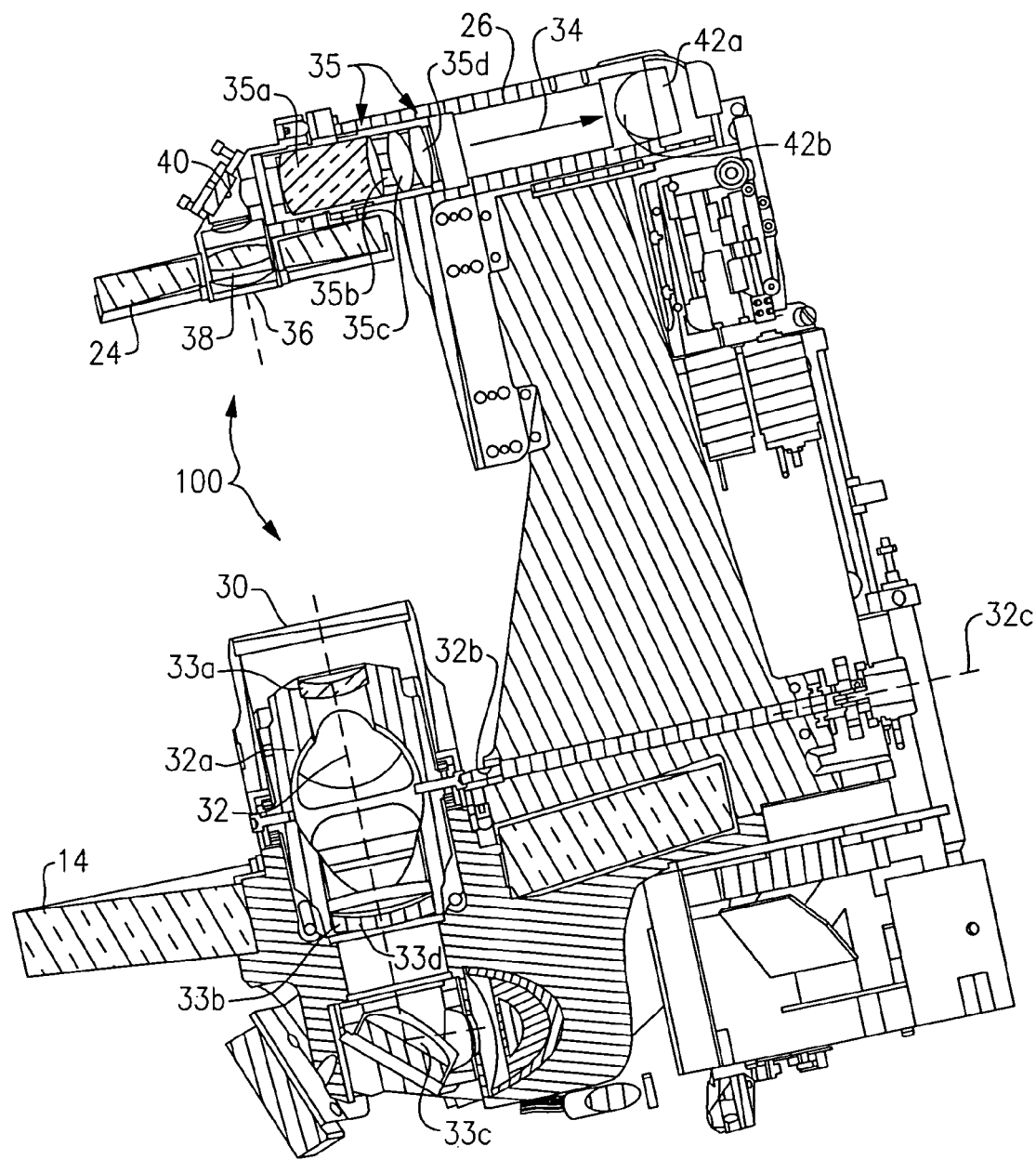
FIG. 3 is a cross sectional view of an optical telescope taken on the line A-A in FIG. 2.

According to a first optical configuration for the IR turret 32a, as shown in FIGS. 1 and 3, an upper group of lenses 33a is disposed proximate the dichroic beam splitter 30 and an opposite lower group of lenses 33b (including the one optical element 32d) are disposed at an opposite end of the IR turret 32a.

The upper and lower group of lenses 33a, 33b direct the IR optical bundle onto an IR fold mirror 33c which folds (i.e., reflects) the optical bundle at approximately a ninety degree angle to a direction that is substantially perpendicular with respect to the center longitudinal axis 16. This allows the placement of other optical groups, as are described in greater detail hereinafter, under the primary mirror 14, thereby preserving the overall compact configuration of the optical telescope 100.

The IR turret 32a includes a second optical configuration (that it is rotated into) that includes a second upper group of lenses that, when rotated into position, are also disposed proximate the dichroic beam splitter 30 and an opposite second lower group of lenses that are also disposed distally away from the dichroic beam splitter 30.

The first and second optical configurations are used when the secondary mirror 24 is not in use, when the turret 26 is rotated into the second position. Accordingly, the first and second optical configurations of the IR turret 32a provide a wide FOV and mid-range FOV in infrared, along the first secondary optical path 32.

It is to be understood that the terms infrared and visible encompass a range of frequencies and wavelengths and that this range is varied as desired for either the first secondary optical path 32 or the second secondary optical path 34.

If desired, a single frequency (i.e., monochromatic) of light can also be used along either optical path, if that is of interest. Filtering techniques for selecting any band or frequency are known to those possessing ordinary skill and these techniques can be incorporated after having had benefit of the instant disclosure to provide the desired band or frequency of light energy wherever desired. What is important to understand is the optical telescope 100 allows the simultaneous acquisition of two different bands or frequencies along two different optical paths at all times.

The IR turret 32a includes a third optical configuration (that it is rotated into) that does not include any elements in the IR turret 32a or otherwise along the first secondary optical path intermediate the dichroic beam splitter 30 and the IR fold mirror 33c. The third optical configuration is provided for use when the secondary mirror 24 is disposed over the primary mirror 14 as in FIG. 1, and the longest focal length in IR (and visible) is provided along the first secondary optical path 32.

In the third optical configuration position, the IR turret 32a is rotated so that no lenses in the IR turret 32a affect the ray bundle of IR that passes through the IR turret 32a. The density of the IR ray bundle that impinges on the IR fold mirror 33c has, preferably, nearly the same density for all FOV's (i.e., wide, mid, narrow).

Magnets are attached to an outside of the IR turret 32a at two of the three optical configuration locations, as desired, and these magnets are precisely located and are sufficiently strong to retain the IR turret 32a in each of two positions, absent a torque being applied by the electrical motor that would rotate the IR turret 32a. The electrical motor is used only to rotate the IR turret 32a from one optical configuration position to another and then back again.

The magnets are used in the first and second optical configuration locations to precisely maintain the upper and lower groups of lenses of the IR turret 32a in position. However, when the IR turret 32a is in the third position (i.e., when no lenses in the IR turret 32a are disposed along the first secondary optical path 32), the magnets may be eliminated and the IR turret 32a allowed to oscillate slightly from side to side as allowed by the tolerances of the drive shaft 32b and those inherent with the electrical motor. This is because the beam path of the first secondary optical path 32 is not affected by the slight wobble of the IR turret 32a when the primary mirror 14 and secondary mirror 24 are included as part of the first secondary optical path 32.

It is preferable that when the IR turret 32a is in the third or center position (i.e., in the "no lens" position) that the magnets are included and used to better hold the IR turret 32a in this position. It is preferable that when the IR turret 32a is in either the first or second optical configuration locations (i.e., when the IR turret 32a is rotated to its maximum in either direction and when lenses in the IR turret 32a are disposed along the first secondary optical path 32) that hard stops be also used and that the magnets used to apply a force to the IR turret 32a that secures it against the hard stops. This is preferred in order to more precisely control the position of the IR turret 32a when it is introducing lens groups into the first secondary optical path 32.

In the first and second optical configuration locations for the IR turret 32a, the turret 26 has first been moved into the second position with the secondary mirror 24 out of the optical path. In this instance, the incident light 28a does not reflect off the primary mirror 14, strike the secondary mirror 24, and then impinge on the dichroic beam splitter 30. The second position for the turret 26 is shown in FIG. 5.

The second position in which the turret 26 has been rotated so that the center of the secondary mirror 24 does not align with the center longitudinal axis 16 as shown in FIG. 5 provides a pair of second primary optical paths (as shown by arrow ends 50 and 52) that are open to receive the ambient incident light 28a directly and therefore features a short focal length (and wide field of view). The pair of second primary optical paths 50, 52 originate with the ambient incident light 28a first striking the surfaces as shown. There is no prior reflecting or bending of the incident light 28a, therefore the pair of second optical paths 50, 52 become primary paths when the turret 26 is in the second position.

Arrow end 50 (FIG. 5) shows incident radiation striking the dichroic beam splitter 30. The longer wavelengths (infrared) pass through the beam splitter 30 along a path similar to that of the first secondary optical path 32 where they are optimally utilized by the optical element(s) 32d in the IR turret 32a.

The incident light 28a passes down along and around the center longitudinal axis 16 and impinges directly on the dichroic beam splitter 30 (arrow 50) where the longer wavelengths (IR) pass through to form the first secondary optical path 32 and the shorter wavelengths are reflected back into space.

In the wide and mid rage FOV positions, the secondary mirror 24 is disposed away from the center longitudinal axis 16 and, accordingly, the first secondary optical path 32 looks directly into space. The IR band of the collimated ambient light that strikes the dichroic beam splitter 30 is then focused, as needed, by the upper and lower lens groups of the IR turret 32a when it is in either the first or the second optical configuration positions.

The effect on the visible spectrum when the turret 26 is in either the first or second position is described in greater detail hereinafter.

After deflection off the IR fold mirror 33c the first secondary optical path 32 continues to an IR focus group of lenses, identified in general by the reference numeral 33d. The IR focus group 33d is adjusted as needed to compensate for distance to the subject. The IR focus group 33d also compensates when the turret 33a is moved between any of the three optical configuration locations (i.e., positions).

A fixed group of IR lenses 33e receives the ray bundle from the IR focus group and directs it into a Dewar 33f. The Dewar is a commercially available assembly that is cryogenically cooled. An IR focal plane array 33g (FPA) that is sensitive in the IR band receives the inverted image and its output is captured. The image can be viewed in real-time or it may be electronically transmitted and stored on a preferred media for future use, as desired.

It is important to note that the optical telescope 100 always allows for simultaneous viewing (i.e., accessing) of at least two channels (i.e., bands) of light and that the infrared band that passes through the dichroic beam splitter 30 and the center aperture 15 along the first secondary optical path 32 is always active regardless of the focal length that the optical telescope 100 is set to.

Other changes and modifications to the first secondary optical path 32 are, of course, possible to those now having had benefit of the instant disclosure.

Referring now to FIG. 3, which shows an interior of the turret 26, the second secondary optical path 34 also includes an optical element group 38 (lenses) that are disposed proximate the second center aperture 36. The optical element group 38 is a correction group of three lenses used correct errors introduced by the Cassegrain configuration (i.e., the primary mirror 14 and the secondary mirror 24).

The second secondary optical path 34 is active only when the turret 26 is in the first position (i.e., when the secondary mirror 24 is disposed over the primary mirror 14).

The second secondary optical path 34 continues up inside of the turret assembly 26 until it impinges on an angled mirror 40. The angled mirror 40 acts as a first visible fold mirror that redirects the second secondary optical path 34 approximately ninety degrees so that it is now perpendicular with respect to the center longitudinal axis 16.

The second secondary optical path 34 then passes through four lens elements in a collimation group, identified in general by the reference numeral 35. A first element 35a of the collimation group 35 extends a substantial amount along a longitudinal axis, through three other elements 35b, 35c, 35d and out into the turret 26 interior.

The second secondary optical path 34 is collimated when it leaves the fourth element 35d of the collimation group 35. Accordingly, if one were to place their eye and look backward into the second secondary optical path 34, it would look like an ambient image, only magnified by the focal length provided by the second secondary optical path 34. The image, according to a preferred embodiment, would appear to be approximately twenty times its normal size anywhere along the collimated portion of the second secondary optical path 34. Accordingly, the eye would be able to focus the magnified image because the human eye is inherently designed to focus collimated ambient light.

The collimated second secondary optical path 34 then continues to pass longitudinally along the length of the turret assembly 26 arm where a second visible fold mirror 42a further redirects the collimated second secondary optical path 34 in the turret 26 at a right angle.

Figure 2:
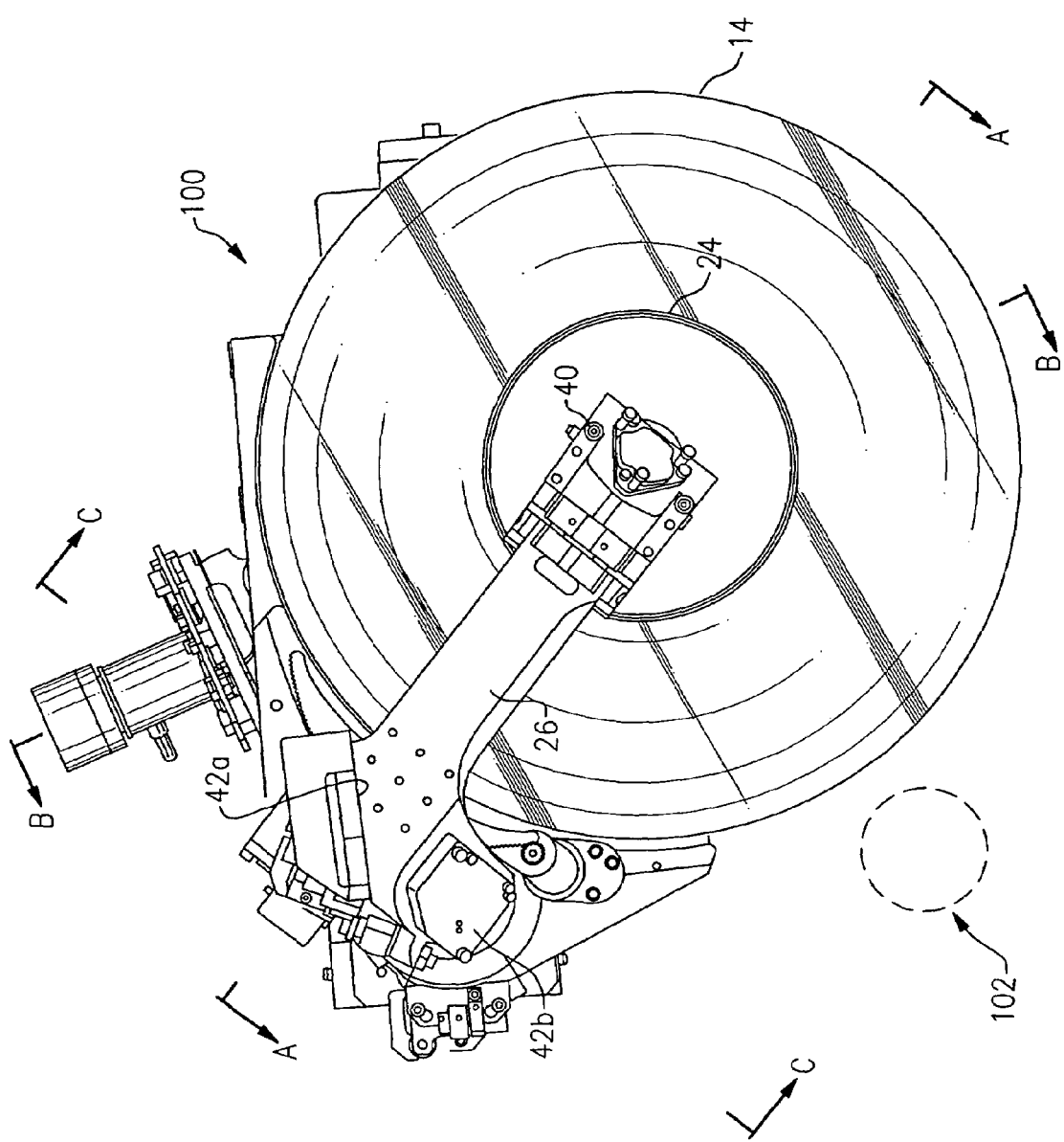
FIG. 2 is a top view of the telescope of FIG. 1 with a secondary mirror disposed over and in concentric alignment with a primary mirror.

The redirected second secondary optical path 34 is still perpendicular with respect to the center longitudinal axis 16 and it now extends along a portion of a section of FIG. 2 that is identified as section C-C until the second secondary optical path 34 visible light impinges on a third visible fold mirror 42b where it is now redirected at another ninety degree angle downward in a direction that is substantially parallel to that of the center longitudinal axis 16 but beyond the outer circumference of the primary mirror 14.

Section C-C extends beyond that portion that the second secondary optical path 34 traverses. Only the portion of section C-C that is disposed between the second visible fold mirror 42a and the third visible fold mirror 42a corresponds with the actual path taken by the second secondary optical path 34.

Figure 4:
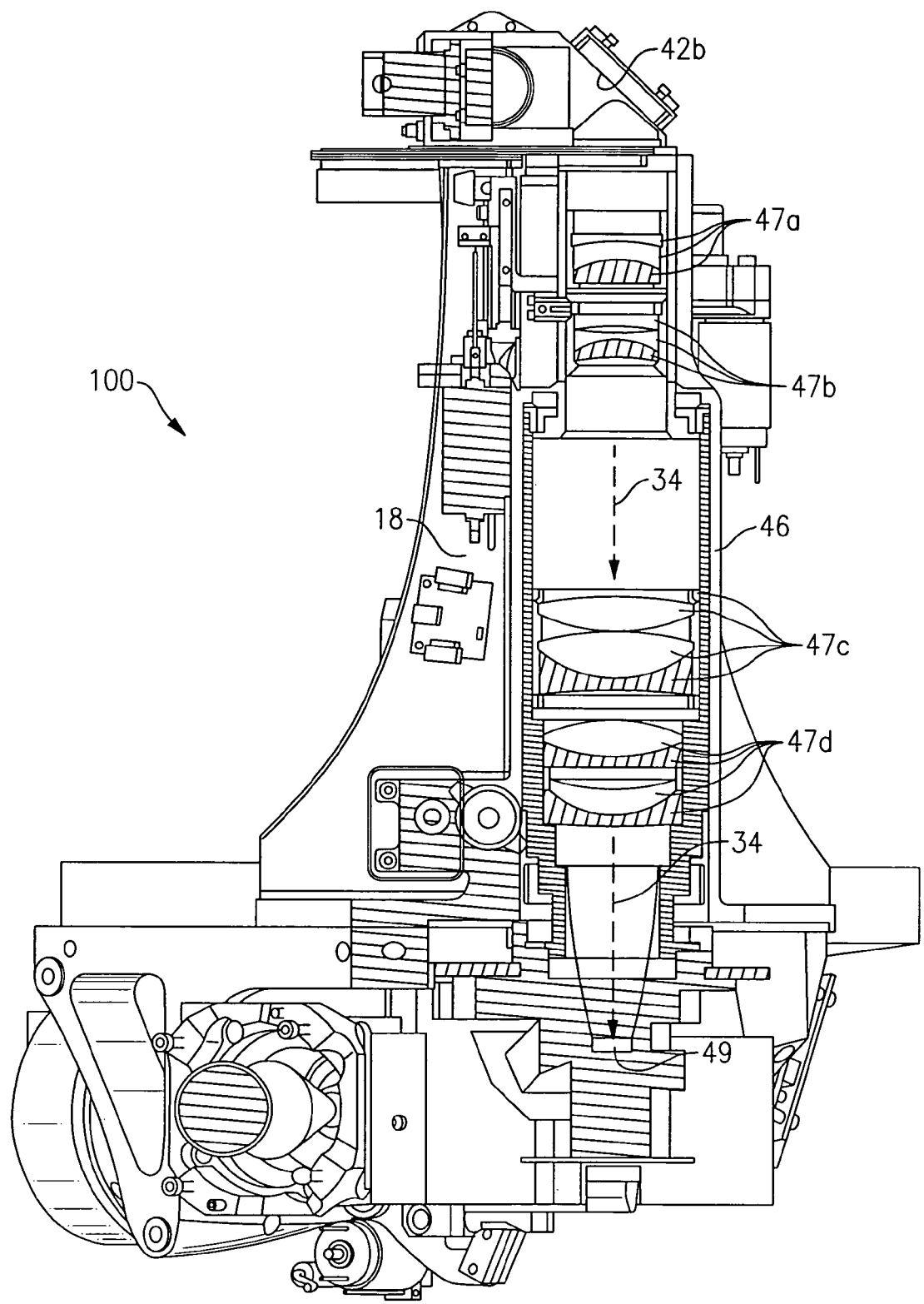
FIG. 4 is a cross sectional view of an optical telescope taken on the line C-C in FIG. 2.

Referring now to FIG. 4, the still collimated second secondary optical path 34 enters into a linear tubular structure 46 that is attached to the upright member 18.

The second secondary optical path 34 is collimated until it enters a visible focus group of lenses 47a. The focus group 47a is adjusted to provide range correction for the distance of the object that is being viewed. The light in the second secondary optical path 34 is no longer collimated.

The second secondary optical path 34 leaves the focus group 47a and enters into a front zoom group of lenses 47b. The front zoom group 47b cooperates with a back zoom group 47c to provide zoom capability in visible wavelengths.

The front zoom group 47b moves in unison toward the back zoom group 47c as the back zoom group 47c moves in unison simultaneously toward the front zoom group 47b to provide a longer focal length (i.e., increased magnification or zoom).

Conversely, the front zoom group 47b moves away from the back zoom group 47c as the back zoom group 47c moves simultaneously away from the front zoom group 47b to provide a shorter focal length.

Accordingly, a variable zoom capability is provided. The position of the front zoom group 47b and the back zoom group 47c as shown in FIG. 4, shows the minimum focal length that is possible for the two zoom groups 47b, 47c.

The zoom capability provided by the optical components in the front group 47b and the back group 47c provide a progressive zoom capability, where exactly the desired degree of zoom is realized by progressively moving select elements of the two zoom groupings 47b, 47c.

Continuous zoom is better than a step function for tracking in the visible spectrum in that any object of interest in the visible spectrum is always visible when zooming, whereas by way of contrast, the object disappears from view momentarily when "stepping" from one focal length (magnification) to another focal length (magnification) and it must then be re-acquired which can be difficult as it will not look the same (it will be either larger or smaller or only a portion of it may be visible) which can impede identification and rapid re-acquisition.

In order to achieve the desired visible zoom capability with a high quality optical arrangement, it is necessary to arrange the optical components of each zoom group 47b, 47c along a relatively long linear path so that the components in each grouping 47b, 47c can be moved longitudinally a required amount in order to affect the field of view (i.e., to zoom in or out).

The light of the second secondary optical path 34 leaves the back zoom group 47c and enters a visible fixed element group 47d. The fixed element group 47d focuses the visible light on a CCD 49. The CCD 49 is a type of FPA and it provides real-time data acquisition for viewing or storage in a desired media for future use.

The first and second secondary optical paths 32, 34 and of course, the first primary optical path 28 features a long focal length (i.e., greater magnification).

Referring again to FIG. 5, with the turret 26 in the second position, arrow end 52 shows incident radiation striking the optical components of the focus group 47a that are disposed at the top of the tubular structure 46, which is now open to ambient light 28a.

The shorter wavelengths pass through the optical groups 47a-47d along a path similar to that of the second secondary optical path 34 where they are optimally utilized. Other wavelengths may also pass through the optical groups 47a-47d or they may be blocked by filters or coatings applied to any of the elements in any of the groups 47a-47d, as desired.

In this mode (i.e., when the turret 26 is in the second position as shown in FIG. 5), the optical telescope 100 has a wider field of view for both infrared and visible that can be used to scan for objects of interest simultaneously in both spectrums of light.

It is important to note that when the turret 26 is in either the first or second position, that two optical paths always remain active allowing for simultaneous two-channel viewing in both IR and visible.

Of course, depending upon how the optical telescope 100 is to be used, it is possible to modify the components so that any of the optical paths (i.e., the first secondary optical path 32, the second secondary optical path 34 or either of a pair of second primary optical paths 50, 52) can be configured to include any spectrum of light that is desired.

It may at times be desirable to scan in a wide field of view, possibly looking for objects of interest in the infrared spectrum. When an IR source is detected, it may be desirable to engage in further observations in the visible spectrum, possibly zooming in. If more magnification is desired, it may desirable to rotate the turret 26 into the first position (i.e., the long focal length as shown in FIGS. 1, 3, and 4) and study the object closer (with even more magnification) in either or both the IR or visible spectrums, while again zooming in or out as desired in visible. The IR turret 32a allows for a stepped zoom capability in IR. Other optical components or groupings (not shown) can be added, if desired, along the first secondary optical path 32 to provide zoom capability in IR.

It is also very important to note that when the turret 26 is in the second position, the secondary mirror 24 is not disposed over the dichroic beam splitter 30, which then becomes the aperture for shorter focal length (wide field of view) observations in IR. This is extremely important because no energy is lost by impinging on any of the component parts of the turret 26 when it is in the second position, neither over the beam splitter 30 nor over the optical groups 47a-47d in the tubular structure 46.

It is also especially important to note that the turret 26 only places a single group of optical elements 38, 40 in the field of view along the second secondary optical path 34. As it rotates it either places the single group of optical elements 38, 40 there or removes it from the field of view. Of course, the secondary mirror 24 is also similarly inserted or removed from the first optical path 28 simultaneous with the optical elements 38, 40 that are being inserted or removed from the second secondary optical path 34. This provides two important primary benefits.

First, there are no additional optical groups that may be disposed over the primary mirror 14 when it is actively being used which could lessen the amount of light striking the primary mirror 14. When the primary mirror 14 is in use, the turret 26 and secondary mirror 24 provide minimum obstruction. This is because the turret 26 aligns with the upright member 18 when the turret 26 is in the first position.

The size of the turret 26 is preferably as close to that of the first end 18a of the upright member 18 (i.e., that portion of the upright member 18 that extends over the primary mirror 14) as is possible to either minimize or eliminate any additional loss of incident light 28a when the turret 26 is disposed in the first position.

Second, because the turret 26 does not have to introduce numerous optical groups into and out of the field of view, it is simple to include a reliable stop that ensures repeatability in the positioning of the turret 26 when the secondary mirror 24 and primary mirror 14 are in use and in alignment. When multiple optical groups are inserted or removed from an active relationship with a different configuration of a primary mirror (not shown herein, consistent with certain types of prior art), multiple stops are required that contribute to variability in positioning of the multiple optical groups.

Other modifications are possible to achieve other benefits. For example, the optical telescope 100 is designed to optimally utilize the inherent diffraction-limited focal lengths of the IR band (which require a shorter IR focal length than visible for any given aperture size). As a result of this inherent limitation, the widest FOV in visible is narrower than the narrowest FOV in IR.

This prevents having the greatest possible focal lengths in visible (which is highly desirable) and having those visible focal lengths correlate directly with the focal length in IR. Certain applications of the optical telescope 100 benefit when there is direct correlation in focal length between visible and IR in that an analysis or viewing that switches back and forth from one band to the other benefits with the object of interest is the same size.

If desired, a secondary zoom visible telescope, shown in dashed lines and identified in general by the reference numeral 102, and having a focal length range comparable to that of the IR band of the optical telescope 100 may be added as a separate component, preferably disposed proximate the optical telescope 100 and parallel thereto. The secondary zoom visible telescope 102 is also varied in focal length whenever the focal length in IR is changed (i.e. when the IR turret 32a is moved) so that an approximate correlation in focal lengths in IR and visible is provided. The optical telescope 100 provides considerably greater focal length capability in visible for even more detailed viewing than is possible with the secondary zoom visible telescope 102.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, a simplified IR turret that only includes two positions may be used instead of the preferred type of IR turret 32a. The simplified IR turret may include groups of lenses in each of two positions or one of the two positions may omit any lenses, as desired. Conversely, a four position IR turret may similarly be designed if a greater number of steps are required in IR.

What is claimed is:

1. An optical telescope, comprising:
    (a) a base assembly that is adapted to support a primary mirror, said primary mirror including a predetermined size and shape and an outer perimeter and a center aperture;
    (b) support means attached to said base assembly, said support means adapted to support a turret a predetermined distance away from said primary mirror, said turret adapted to pivot from a first position wherein a secondary mirror that is attached to said turret is disposed over said primary mirror and wherein said primary mirror and said secondary mirror are included in a primary optical path when said turret is in said first position, into a second position and wherein said secondary mirror is not in said primary optical path when said turret is in said second position, and wherein when said turret is in said first position said primary optical path is provided that includes said primary mirror and said secondary mirror and wherein when said turret is in said second position a second primary optical path is provided that does not include said primary mirror or said secondary mirror; and
    (c) a beam splitter disposed over at least a portion of said center aperture, and wherein when said turret is in said first position, said secondary mirror is adapted to receive light energy reflected off said primary mirror and redirect at least a portion of said light energy to said beam splitter along said primary optical path and wherein at least one frequency of light passes through said beam splitter and travels along a first secondary optical path and wherein a different frequency of light is reflected off said beam splitter and travels along a second secondary optical path that is different than said first secondary optical path.

2. The optical telescope of claim 1 wherein said first secondary optical path includes a longer wavelength of light than said second secondary optical path.

3. The optical telescope of claim 2 wherein said first secondary optical path includes light energy in an infrared or near infrared spectrum.

4. The optical telescope of claim 2 wherein said second secondary optical path includes light energy in a visible spectrum of light.

5. The optical telescope of claim 4 wherein said first secondary optical path includes a first band of light wavelengths and wherein said second secondary optical path includes a second band of light wavelengths that is different than said first band.

6. The optical telescope of claim 2 wherein when said turret is in said first position, said optical telescope includes a longer focal length than when said turret is in said second position.

7. The optical telescope of claim 6 wherein said first secondary optical path extends through said beam splitter and through said center aperture to a location that is disposed below a reflective surface of said primary mirror.

8. The optical telescope of claim 7 including an IR turret that is disposed below said beam splitter along said first secondary optical path, and wherein said IR turret is adapted to pivot about an axis from a first position into at least a second position.

9. The optical telescope of claim 8 wherein at least one optical element is adapted to be disposed in said first secondary optical path by said IR turret when said IR turret is in said first position during the distance that said first secondary optical path passes through said IR turret.

10. The optical telescope of claim 8 wherein at least one optical element is adapted to be disposed in said first secondary optical path by said IR turret when said IR turret is in said second position during the distance that said first secondary optical path passes through said IR turret.

11. The optical telescope of claim 8 wherein when said IR turret is in said first position no optical elements are disposed in said first secondary optical path by said IR turret during the distance that said first secondary optical path passes through said IR turret.

12. The optical telescope of claim 8 wherein when said IR turret is in said second position no optical elements are disposed in said first secondary optical path by said IR turret during the distance that said first secondary optical path passes through said IR turret.

13. The optical telescope of claim 8 wherein at least one optical element is adapted to be disposed in said first secondary optical path by said IR turret when said IR turret is in said first position and wherein at least one optical element is adapted to be disposed in said first secondary optical path by said IR turret when said IR turret is in said second position.

14. The optical telescope of claim 13 wherein said IR turret includes a third position and wherein when said IR turret is disposed in said third position no optical elements are disposed in said first secondary optical path by said IR turret during the distance that said first secondary optical path passes through said IR turret.

15. The optical telescope of claim 8 including an IR fold mirror that reflects a ray bundle of said first secondary path sufficient to include a change in direction of said first secondary path after said first secondary path has passed through said IR turret.

16. The optical telescope of claim 15 wherein said change in direction includes a ninety-degree change in direction.

17. The optical telescope of claim 15 including an IR focus group of optical elements that said ray bundle of said first secondary path impinges on after said ray bundle has been reflected off said IR fold mirror.

18. The optical telescope of claim 17 including a fixed group of optical elements that receives said ray bundle from said IR focus group of optical elements and wherein said fixed group of optical elements is adapted to direct said ray bundle into a Dewar.

19. The optical telescope of claim 18 wherein said Dewar is cryogenically cooled.

20. The optical telescope of claim 18 including a focal plane array disposed in said Dewar.

21. The optical telescope of claim 8 including a drive shaft that is functionally attached to said IR turret and wherein when said drive shaft is rotated a sufficient amount in a first direction, said IR turret is displaced from said first position into said second position and wherein when said drive shaft is rotated a sufficient amount in a direction that is opposite said first direction, said IR turret is displaced from said second position into said first position.

22. The optical telescope of claim 21 including means for maintaining said IR turret in said first position.

23. The optical telescope of claim 22 wherein said means for maintaining said IR turret includes magnetic means.

24. The optical telescope of claim 8 wherein at least one optical element is adapted to be disposed in said first secondary optical path by said IR turret at a location that is below a reflective surface of said primary mirror.

25. The optical telescope of claim 8 wherein said IR turret is adapted to place a plurality of optical elements into or out of said first secondary optical path when said IR turret is disposed in either said first or said second position.

26. The optical telescope of claim 8 wherein said IR turret is adapted to place a plurality of optical elements simultaneously into or out of said first secondary optical path when said IR turret is disposed in either said first or said second position.

27. The optical telescope of claim 1 wherein said beam splitter includes a dichroic beam splitter.

28. The optical telescope of claim 1 wherein when said turret is in said first position, said beam splitter is adapted to redirect said second secondary path back toward a second center aperture provided in said secondary mirror and wherein at least a portion of said second secondary optical path passes through said second aperture.

29. The optical telescope of claim 28 wherein said second secondary path includes light energy having a shorter wavelength than light energy in said first secondary path, and wherein said shorter wavelength includes energy in the visible or near infrared spectrum.

30. The optical telescope of claim 29 wherein said second secondary path passes through said second aperture in said secondary mirror and into said turret.

31. The optical telescope of claim 30 wherein said second secondary path includes a ray bundle that impinges on a first visible fold mirror in said turret after said ray bundle passes through said second aperture, and wherein said first visible fold mirror reflects said ray bundle an amount sufficient to include a change in direction of said second secondary path in said turret.

32. The optical telescope of claim 31 wherein said change in direction of said second secondary path includes ninety degrees, and including a collimation group of lenses in said turret, and wherein said ray bundle is directed to said collimation group of group of lenses, and wherein said collimation group of lenses adapted to collimate said ray bundle sufficient to provide a collimated ray bundle and to direct said collimated ray bundle along a longitudinal length of said turret.

33. The optical telescope of claim 32 including a second visible fold mirror in said turret, said second visible fold mirror disposed along said longitudinal length of said turret distally from said first visible fold mirror, and wherein said second visible fold mirror is adapted to change a direction of said collimated ray bundle ninety degrees in said turret and direct said collimate ray bundle along a second longitudinal length of said turret.

34. The optical telescope of claim 33 including a third visible fold mirror in said turret, said third visible fold mirror disposed along said second longitudinal length of said turret distally from said second visible fold mirror, and wherein said third visible fold mirror is adapted to change a direction of said collimated ray bundle ninety degrees in said turret and direct said collimated ray bundle into a new direction.

35. The optical telescope of claim 34 wherein said new direction is substantially parallel with that of incident light that strikes the primary mirror.

36. The optical telescope of claim 35 wherein said new direction is disposed beyond a perimeter of said primary mirror.

37. The optical telescope of claim 34 wherein said collimated ray bundle is directed to a visible focus group of optical elements.

38. The optical telescope of claim 37 wherein said visible focus group of optical elements is adapted to correct for variations in the distance to an object that is being viewed by said optical telescope.

39. The optical telescope of claim 38 wherein said ray bundle is not collimated after having passed through said visible focus group of optical elements, and wherein said ray bundle continues along said second secondary optical path to a zoom group of optical elements sufficient to vary an overall focal length of said ray bundle.

40. The optical telescope of claim 39 wherein said zoom group of optical elements includes an upper group of elements and a back group of elements and wherein said upper group of elements is adapted to be urged toward or away from said back group of elements and wherein said back group of elements is adapted to be urged toward said upper group of elements when said upper group of elements is urged toward said back group of elements and wherein said back group of elements is adapted to be urged away from said upper group of elements when said upper group of elements is urged away from said back group of elements.

41. The optical telescope of claim 40 wherein said overall focal length is increased as said upper group of elements and said back group of elements are urged closer toward each other and wherein said overall focal length is decreased as said upper group of elements and said back group of elements are urged further away from each other.

42. The optical telescope of claim 39 wherein said ray bundle of said second secondary optical path passes through a visible fixed element group after said zoom group.

43. The optical telescope of claim 42 wherein said ray bundle is directed by said visible fixed element group onto a focal plane array.

44. The optical telescope of claim 43 wherein said focal plane array includes a COD type of a charge coupled device.

45. The optical telescope of claim 34 wherein said collimated ray bundle is directed to at least one additional optical element.

46. The optical telescope of claim 45 wherein said at least one optical element is disposed in a tubular structure.

47. The optical telescope of claim 32 including a second visible fold mirror in said turret, said second visible fold mirror disposed along said longitudinal length of said turret distally from said first visible fold mirror, and wherein said second visible fold mirror is adapted to change a direction of said collimated ray bundle ninety degrees in said turret and direct said collimate ray bundle to at least one additional optical element.

48. The optical telescope of claim 47 wherein said at least one optical element is disposed in a tubular structure.

49. The optical telescope of claim 1 wherein when said turret is in said second position, said secondary mirror is disposed beyond said aperture in said primary mirror and wherein when said secondary mirror is disposed beyond said aperture, said secondary mirror does not obstruct an active field of view along said second primary optical path and wherein incident light energy is adapted to impinge directly on said beam splitter.

50. The optical telescope of claim 49 wherein said at least one frequency of light passes through said beam splitter along said second primary optical path and wherein said at least one frequency of light includes a longer wavelength than a remainder of said incident light energy that also impinges on said beam splitter and is reflected off said beam splitter.

51. The optical telescope of claim 1 wherein said second primary optical path includes a ray bundle that passes through said beam splitter and wherein said ray bundle is adapted to pass through an IR turret that is disposed below said beam splitter, and wherein said IR turret is adapted to pivot about an axis from a first position into at least a second position, and wherein said IR turret is adapted to place a plurality of optical elements into or out of said second primary optical path when said IR turret is disposed in either said first or said second position.

52. The optical telescope of claim 51 including a focal plane array and means for directing said ray bundle of said second primary optical path from said IR turret to said focal plane array.

53. The optical telescope of claim 52 wherein said focal plane array is disposed in a Dewar.

54. The optical telescope of claim 1 wherein said second primary optical path includes a shorter focal length than said primary optical path.

55. The optical telescope of claim 1 wherein when said turret is in said second position, said turret is disposed away from an optical element that is adapted to receive incident ambient light and wherein said incident ambient light forms said second primary optical path.

56. The optical telescope of claim 55 wherein said second primary optical path includes a visible wavelength and wherein said optical element includes a zoom group of optical elements.

57. The optical telescope of claim 55 including a focal plane array and wherein said incident ambient light is directed to said focal plane array.

58. An improved optical telescope of the type having a primary mirror and a secondary mirror wherein the secondary mirror is adapted to be urged intermediate a first position and a second position and wherein, when the secondary mirror is disposed in the first position, it is included in a primary optical path that receives light energy that has been reflected off the primary mirror, wherein the improvement comprises:

providing an aperture in said primary mirror and including means for splitting said primary optical path into two secondary optical paths, and wherein a first of said two secondary optical paths allows a first portion of said light energy to pass through said aperture to a location that is disposed below said primary mirror and wherein a second of said two secondary optical paths allows a second portion of said light energy to pass to a location that is disposed above said primary mirror, and wherein said first portion of said light energy includes a different wavelength than said second portion of said light energy.

59. An improved optical telescope of the type having a primary mirror and a secondary mirror wherein the secondary mirror is adapted to be urged intermediate a first position and a second position and wherein, when the secondary mirror is disposed in the first position, it is included in a primary optical path that receives light energy that has been reflected off the primary mirror, wherein the improvement comprises:

providing an aperture in said primary mirror and including means for splitting said primary optical path into two secondary optical paths, and wherein a first of said two secondary optical paths allows a first portion of said light energy to pass through said aperture to a location that is disposed below said primary mirror and wherein a second of said two secondary optical paths allows a second portion of said light energy to pass to a location that is disposed above said primary mirror, and wherein said first portion of said light energy includes a different wavelength than said second portion of said light energy, and wherein a first focal plane array that is adapted to receive at least some of said first portion of said light energy is disposed in said first of said two secondary optical paths and wherein a second focal plane array that is adapted to receive at least some of said second portion of said light energy is disposes in said second of said two secondary optical paths.

60. An improved optical telescope of the type having a primary mirror and a secondary mirror wherein the secondary mirror is adapted to be urged intermediate a first position and a second position, wherein the improvement comprises:

providing a first of two optical paths that includes light energy at a first wavelength and providing a second of said two optical paths that includes light energy at a second wavelength and wherein said second wavelength is different than said first wavelength and wherein at least a portion of said first of said two optical paths is adapted to receive said first wavelength when said secondary mirror is disposed in either said first position or in said second position, and wherein at least a portion of said second of said two optical paths is adapted to receive said second wavelength when said secondary mirror is disposed in either said first position or in said second position.

\* \* \* \* \*